(12) United States Patent
Kanefsky

(10) Patent No.: US 6,799,033 B2
(45) Date of Patent: Sep. 28, 2004

(54) SCROLLING DISPLAY FOR MOBILE TELEPHONE TEXT MESSAGING

(75) Inventor: Steve Kanefsky, Redmond, WA (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

(21) Appl. No.: 10/120,475

(22) Filed: Apr. 10, 2002

(65) Prior Publication Data

US 2003/0036393 A1 Feb. 20, 2003

Related U.S. Application Data

(60) Provisional application No. 60/283,747, filed on Apr. 13, 2001.

(51) Int. Cl.[7] .............................................. H04M 11/10
(52) U.S. Cl. .................................. 455/412.1; 455/466
(58) Field of Search ................................ 455/466, 566, 455/412.1, 412.2, 550; 340/7.5, 7.51, 7.55; 709/204, 206, 210

(56) References Cited

U.S. PATENT DOCUMENTS 6,052,070 A * 4/2000 Kivela et al. .................. 341/22
2001/0006889 A1 * 7/2001 Kraft ........................... 455/412

* cited by examiner

Primary Examiner—Lee Nguyen
(74) Attorney, Agent, or Firm—Ipsolon LLP

(57) ABSTRACT

A mobile telephone text messaging device has an integrated display rendered on a display screen. The integrated display includes a past message display segment of static text and a message composition segment that functions as an input field. The past message display segment and the message composition segment are rendered together simultaneously.

22 Claims, 5 Drawing Sheets

SCROLLING DISPLAY FOR MOBILE TELEPHONE TEXT MESSAGING

This application claims the benefit of 60/283,747 filed on Apr. 13, 2001.

TECHNICAL FIELD

The present invention relates to mobile telephone short text messaging and, in particular, to a concurrent display of one or more past messages and a new message that is being composed.

BACKGROUND AND SUMMARY

Mobile telephone systems include a variety of services and functions beyond simple direct voice communication. One such service is short text messaging in which short text messages, sometimes of up to a maximum length, are sent between mobile telephones and other digital devices in accordance with a mobile telephone short message service (SMS) standard (e.g., GSM Phase 1).

Instant messaging is a communication service that is similar to mobile telephone short message service, but with instant messaging users commonly use personal computers as the client communication device. Mobile telephone short message services and instant messaging are similar in that a message originator composes a message (i.e., on a specialized telephone or computer, respectively) and sends the message across a communication network to a recipient. In the context of mobile telephone systems, both messaging types may be referred to as mobile telephone short text messaging.

In conventional mobile telephone short text messaging a user typically must manually check for new messages or manually navigate through one or more display screens to view a new message when it arrives. In the latter case, the user is often notified by an intrusive audible or visual alert rather than simply seeing new messages scroll by on the screen. In this conventional messaging, a user typically must flip between different screens to view old messages and type new ones. Since short text messaging is generally an informal means of communication with a rapid exchange of brief messages, an alert for each message and a need to flip or switch between display screens for each message detracts from the communication experience and can reduce it to being analogous to email.

Accordingly, the present invention includes a mobile telephone text messaging device having an integrated display rendered on a display screen. In one implementation, the integrated display includes a past message display segment of static text and a message composition segment that functions as an input field. The past message display segment and the message composition segment are rendered together simultaneously.

The static text of the past message display segment is used to display one or more past messages, and the input field of the message composition segment allows the user to input a new message on the same screen. This gives a user the impression that all of the text messaging occurs within a single display window with a direct connection to the other text messaging participant or participants. This integrated display contrasts with most other mobile telephone messaging systems, which typically feel more like offline message-management systems with menu-structured user interfaces.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
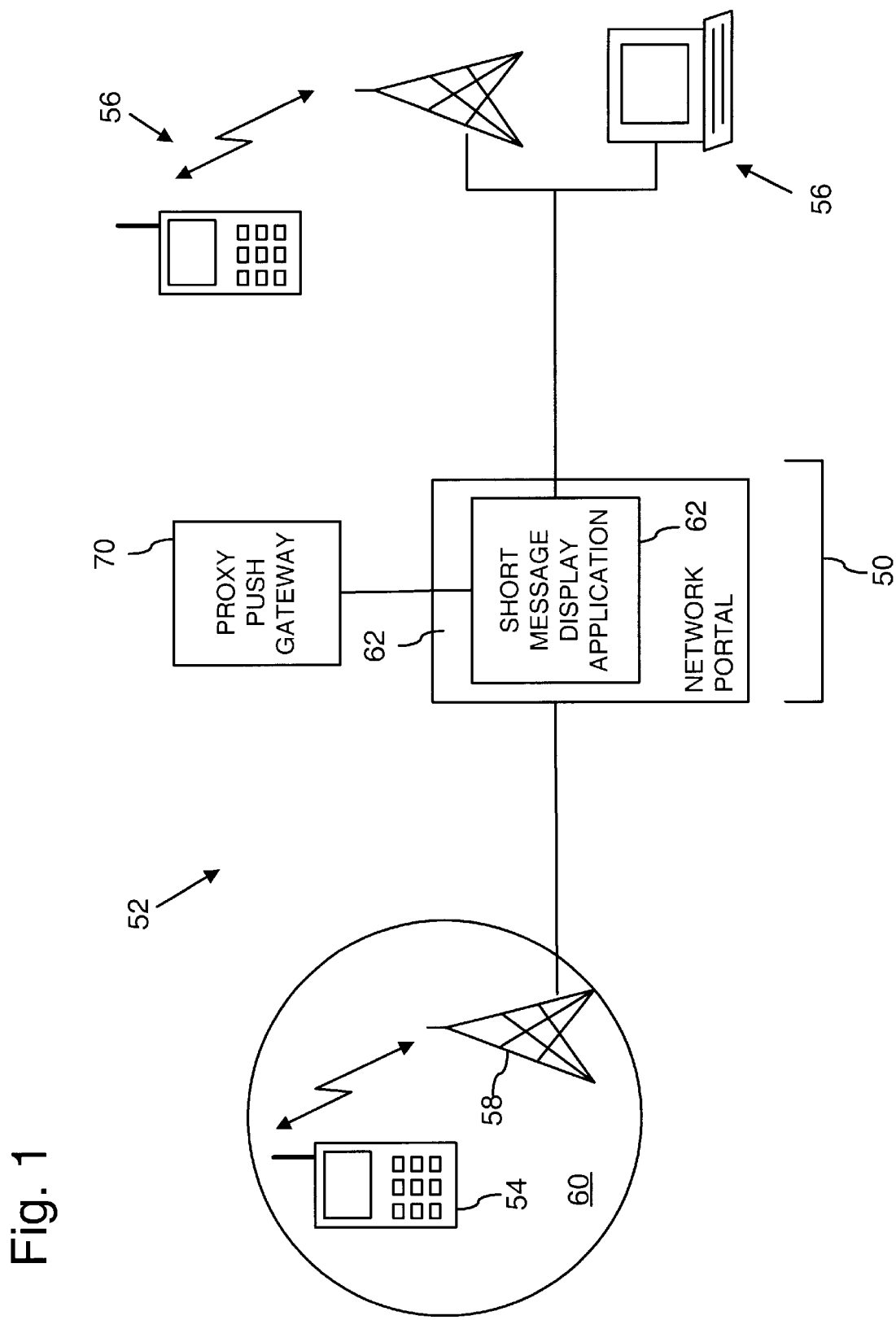
FIG. 1 is a functional block diagram of a short text messaging system of a mobile telephone network to illustrate an operating environment of the present invention.

FIG. 1 is a functional block diagram of a text messaging system 50 of a mobile telephone network 52 to illustrate an operating environment of the present invention. An exemplary mobile telephone 54 is shown as being in wireless or radiated communication with mobile telephone network 52.

Text messaging system 50 supports a short text message service by which short text messages, in some cases of up to a maximum length, may be transmitted or received by mobile telephones, such as mobile telephone 54. Text messaging system 50 may be part of a conventional short message service (SMS) system, or may operate independently of such a system.

Text messages are conveyed between mobile telephone 54 and one or more other text messaging devices 56 via text messaging system 50. Messaging device 56 may be of any type compatible with or employing short length text messaging, including mobile telephones, networked personal computers, handheld computing or digital devices, or any other such device. It will be appreciated that such text messages may also be transmitted between messaging devices 56 that do not include a mobile telephone 54. The description of text messaging system 50 as including mobile telephone 54 is merely an example of one configuration of the operating environment.

Mobile telephone network 52 includes a wireless or radiating transceiver station 58 that corresponds to a communication cell 60, and mobile telephone network may include one or more cells. Mobile telephone 54 within cell 60 communicates with mobile telephone network 52 via a wireless or radiating link with transceiver station 58. Transceiver station 58 communicates with one or more messaging applications, such as a short text message display application 62 according to the present invention. Short text message display application 62 may operate at a computer network portal 64, for example, that is in computer network communication with text messaging devices 54 and 56 and a push proxy gateway 70.

With reference to text message communication from a messaging device 56 to mobile telephone 54, for example, push proxy gateway 70 functions to push a current new message, as well as one or more past messages to mobile telephone 54 to be displayed concurrently. In operation, current and past message information is sent from messaging device 56 to short text message display application 62, which forwards the information to push proxy server 70. Push proxy server 70 passes the information to mobile telephone 54, which uses the information to obtain the current new message and one or more past messages via the short text message display application 62.

In one implementation, the current and past message information may be in the form a network address (e.g., a Uniform Resource Locator, or URL) and may be accompanied by the mobile telephone address. Optionally, a pull proxy gateway (not shown) may be positioned between short text message display application 62 and messaging devices (e.g., mobile telephone 54 and messaging devices 56) to receive the current and past message information requesting messages from short text message display application 62.

It will be appreciated that computer network portal 64 and push proxy gateway 70 may each be implemented with one or more specialized or general-purpose computer systems. Such systems commonly include a high speed processing unit (CPU) in conjunction with a memory system (with volatile and/or non-volatile memory), an input device, and an output device, as is known in the art. Computer network portal 64 and push proxy gateway 70 may be located together or may be remote from each other, as is known in the art. Mobile telephone network 52 may be a packet-based network or a circuit switched network, as are known in the art.

Figure 2:
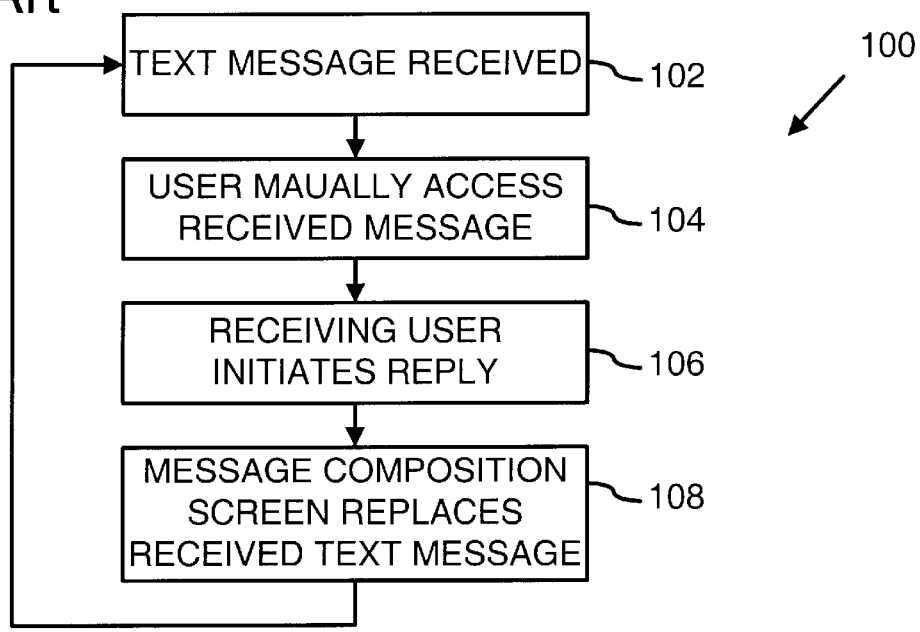
FIG. 2 is a flow diagram illustrating a prior art text messaging display sequence of mobile telephone messaging displays that are rendered on a display screen of a user mobile telephone.

FIG. 2 is a flow diagram illustrating a prior art text messaging display sequence 100 of mobile telephone messaging displays that are rendered on a display screen of a first mobile telephone or like wireless messaging device during a short text message conversation. While being similarly applicable to mobile telephones and other wireless messaging devices, the following description refers only to mobile telephones for purposes of simplicity.

Step 102 indicates that a text message or notification of a text message from another mobile text messaging user is received at the first mobile telephone. Typically, the user is notified to check for the new message by an intrusive audible or visual alert.

Step 104 indicates that the user of the first mobile telephone manually accesses the received text message and has it rendered on the display screen of the first mobile telephone. For example, the user manually checks for new messages or manually navigates through one or more screens to view a new message when it arrives.

Step 106 indicates that the receiving user initiates a reply text message in response to the received text message, such as by navigating through multiple display screens to a message composition window.

Step 108 indicates that a text message composition screen replaces the received text message on the display screen of the first mobile telephone. The text message composition screen allows the user to enter or compose a reply text message and send it to the sender of the received text message. To be certain of the message for which the reply message is being prepared, the user typically must flip or switch between different screens for viewing old messages and typing the new reply message. Process block 108 returns to process block 102 when another text message or notification is received at the first mobile telephone, thereby replacing or disrupting entry of the reply text message.

Text messaging display sequence 100 illustrates a shortcoming of prior art mobile telephone messaging displays, namely that the display screen for each messaging operation replaces the display screen of a different messaging step. A user cannot see prior messages when composing a reply message, and must typically pass through several display screens to switch from a message composition screen to a past message display screen. In addition, frequent audible or visual alerts indicating the receipt of new messages during a text message conversation can be a distracting nuisance for a user.

Figure 3:
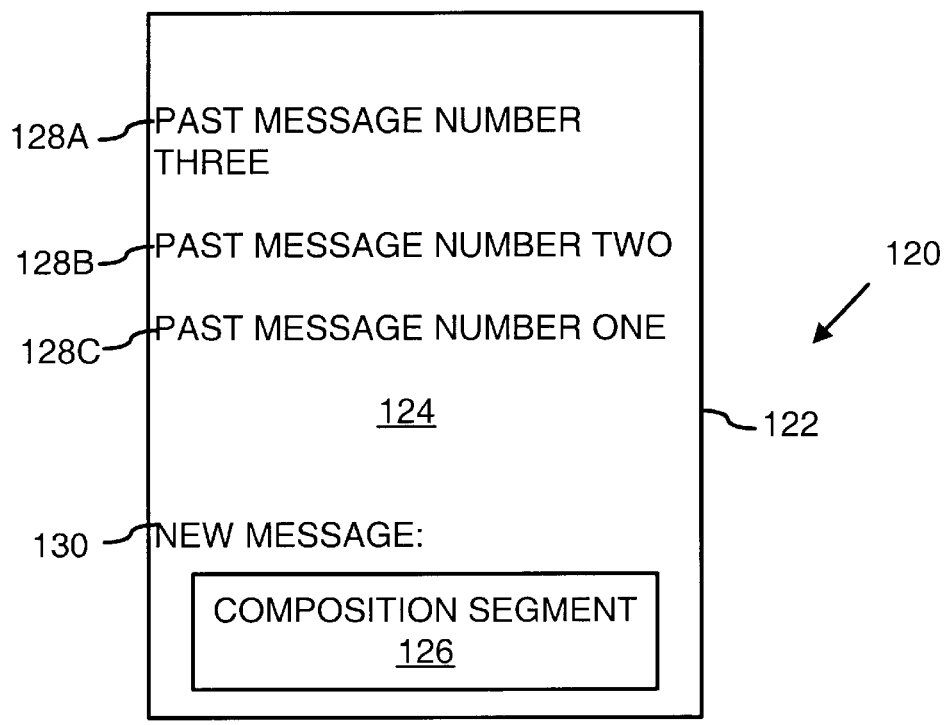
FIG. 3 is schematic diagram illustrating a mobile telephone display screen having displayed thereon an integrated messaging display.

FIG. 3 is schematic diagram illustrating a mobile telephone display screen 120 having rendered thereon an integrated messaging display 122 as a text messaging user interface. Integrated messaging display 122 includes a past message display segment 124 and a message composition segment 126 that are rendered simultaneously on display screen 120.

Past message display segment 124 displays one more past text messages 128A, 128B, etc. of a message thread or conversation, as well as an opening or prompt (e.g., "New Message") 130 for a user to compose a new message. Message composition segment 126 allows new messages to be composed simultaneously without interruption from incoming new messages. Although designated by a box in FIG. 3 for purposes of illustration, message composition segment 126 would typically not be separately outlined by such a display border.

Integrated messaging display 122 allows a user to view past messages in a message thread while composing a new message. As illustrated by prior text messaging display sequence 100, conventional text messaging displays provide either a received message display or a message composition display, but not both simultaneously. A benefit of integrated messaging display 122 is that a composing user can have ready access to past messages to compose a highly relevant message without having to ask the other conversant to repeat a past message. Therefore, integrated messaging display 122 allows mobile telephone text messaging to be much more efficient and directed than is commonly the case now.

Set forth below is a description of one implementation of integrated messaging display 122 characterized in the terminology of Handheld Device Markup Language (HDML), which is a language used to define hypertext-like content and applications for hand-held devices with small displays. It will be appreciated that the use of this terminology is illustrative and that integrated messaging display 122 and its related features may be implemented using technologies other than HDML, such as Wireless Markup Language (WML) or Wireless Application Protocol (WAP) or others.

HDML has a user-interface metaphor based on successive displays or "cards" that the user displays or interacts with. Navigation includes moving "forward" and "back," with forward usually meaning display a next card and back usually meaning display a previous card. HDML cards may be any of a variety of types including Choice, Entry, Display, NoDisplay. In addition, HDML includes variables that are named pieces of information that may be substituted into HDML at runtime and can be set, for example, by a user interacting with choice or entry cards.

With reference to both HDML and WML terminology, past message display segment 124 corresponds to a multi-line Entry card in which one or more past messages 128 and new message prompt 130 are displayed as static text. Message composition segment 126 operates as an input field into which new message text is entered and corresponds to a new message variable stored in a memory unit of mobile telephone 54, for example.

The static text of past message display segment 124 is used to display recent past messages, and the input field of message composition segment 126 allows the user to input a new message on the same screen. This gives a user the impression of working within a single display window with a direct connection to the other text messaging participant or participants. In an implementation employing a messaging device having a send button, the button may be dedicated to submitting or transmitting new messages.

Figure 4:
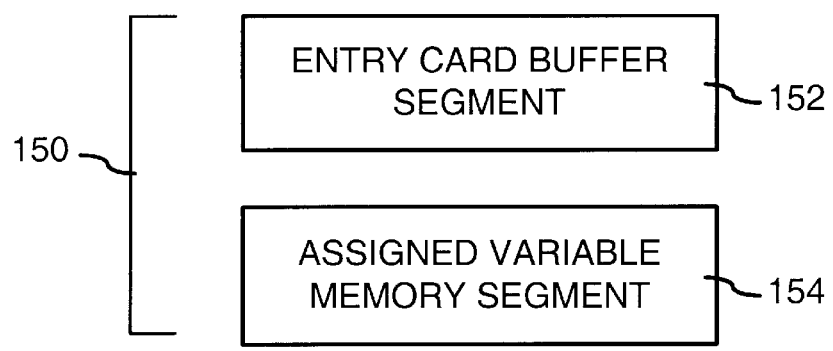
FIG. 4 is a block diagram of a portion of a mobile messaging device memory unit having an entry card buffer segment and an assigned variable memory segment.

FIG. 4 is a block diagram of a portion of a mobile device memory unit 150 having an entry card buffer segment 152 and an assigned variable memory segment 154. Entry card buffer segment 152 corresponds to a conventional mobile device memory buffer that in some implementations can store up to about 1.5 kbytes of data. Assigned variable memory segment 154 corresponds to an assigned variable portion of mobile device memory unit 150 and is generally distinct from entry card buffer segment 152.

Figure 5:
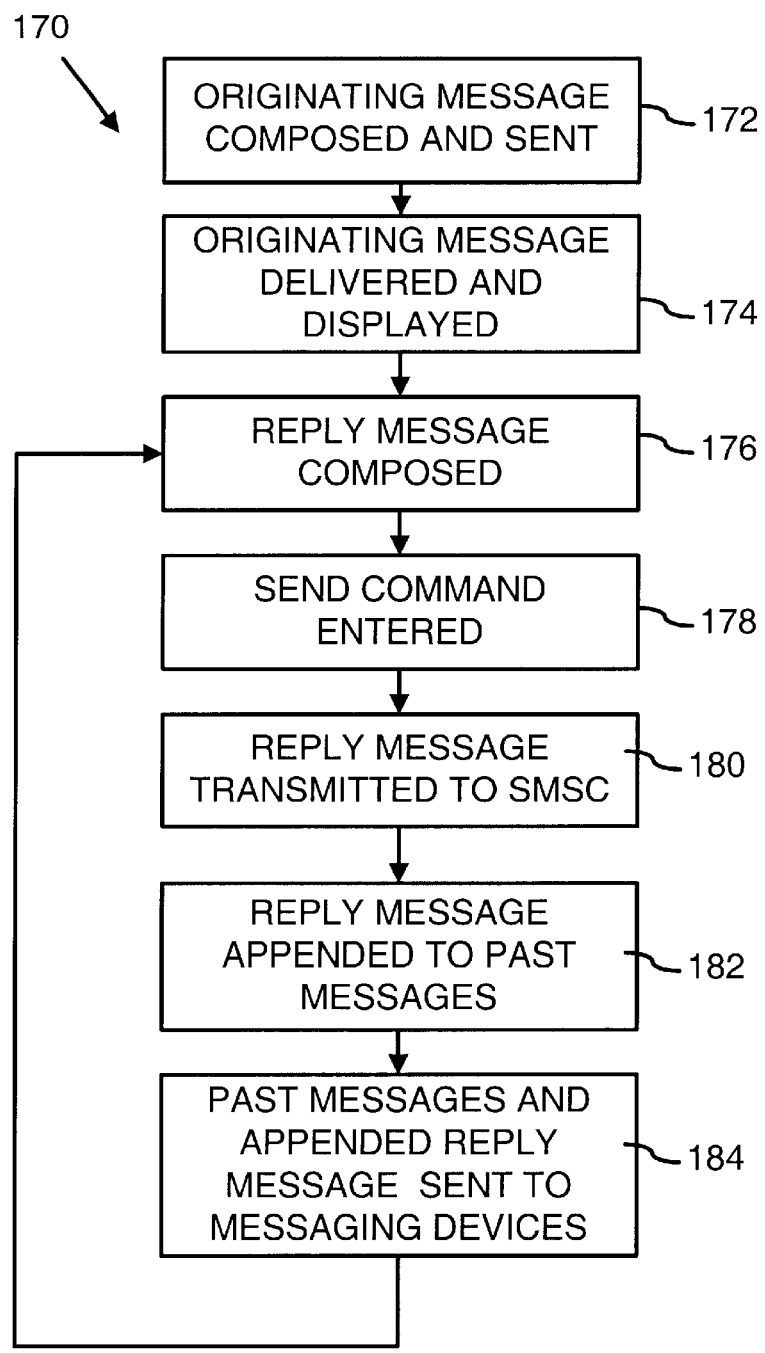
FIG. 5 is a flow diagram of an integrated display messaging process for mobile telephone text messaging.

FIG. 5 is a flow diagram of an integrated display messaging process 170 for mobile telephone text messaging. Integrated display messaging process 170 supports integrated messaging display 122 in the context of a conventional architecture for a portable messaging device such as a mobile telephone or the like.

Process block 172 indicates that an originating message in a text messaging thread is composed and sent from a text messaging device of an originating user to a text messaging device of a recipient user. It will be appreciated that references to originating and recipient users merely distinguish the two users with respect to a given message thread and that either user could be the originating or the recipient user.

Process block 174 indicates that the originating message is delivered to entry card buffer segment 152 and displayed in past message display segment 124 of the recipient text messaging device.

Process block 176 indicates that a reply message is composed in reply to a prior message, such as the initial text message or a subsequent message in a thread of multiple messages. For example, the reply message is composed in message composition segment 126 of the text messaging device of either the originating user or the recipient user. For generality this text messaging device is referred to as a replying text messaging device, and the reply message is directed to a destination text messaging device that can be of either the originating user or the recipient user.

Process block 178 indicates that a send command is entered into the replying text messaging device to send the reply message.

Process block 180 indicates that the reply message is transmitted to short text messaging application 62.

Process block 182 indicates that the reply message is appended to the one or more past messages 128. In one implementation, the reply message is appended to the one or more past messages 128 by short text messaging application 62. In an alternative implementation, the reply message may be appended to the one or more past messages 128 at the replying text messaging device and then transmitted to short text messaging application 62.

Process block 184 indicates that the one or more past messages 128 with the appended reply message is transmitted to the replying text messaging device and the destination text messaging device. For example, the one or more past messages 128 with the appended reply message are delivered to entry card buffer segment 152 of the replying text messaging device and the destination text messaging device and the most recent message or messages (i.e., including at least the appended reply message) are rendered in past message display segment 124 of the destination text messaging device. Transmitting the appended reply message to the replying text messaging device and the destination text messaging device provides both devices with conformed or matched text messaging displays. Process block 184 returns to process block 176.

In one implementation, short text message display application 62 may function to buffer messages, including reply messages and past messages 128, and relay the messages to the appropriate users. Short text message display application 62 can add each new message into a buffer for each recipient and re-send the entire buffer when a new message is added. This ensures that several previous messages are visible rather than just the latest one. The user's own previous messages appear in the buffer in the appropriate context, giving a complete recount of the recent conversation.

Conventionally, mobile telephone text messaging operates on a messaging device within or through a browser or "micro-browser," as is known in the art. Transmitting a text message to a messaging device using a browser or "micro-browser" includes sending the messaging device a message notification, which may include sending a network address (e.g., Uniform Resource Locator or URL) from which the message can be retrieved (referred to as a message retrieval address). In response, the messaging device accesses the message retrieval address and the text message is delivered to the messaging device and rendered by the browser or "micro-browser."

One implementation of the present invention can likewise operate on a messaging device within or through a browser or "micro-browser." Transmitting a text message with one or more past messages to a messaging device includes sending the messaging device a message notification, which may include sending a network address (e.g., Uniform Resource Locator or URL) from which the text message with one or more past messages can be retrieved (referred to as a message retrieval address). In response, the messaging device accesses the message retrieval address, and the text message with one or more past messages is delivered to the messaging device and rendered by the browser or "micro-browser."

In this implementation, one aspect of conventional messaging device browsers or "micro-browsers" can hamper delivery of the text message with one or more past messages to the messaging device transmitting the new text message. Conventionally, messaging device browsers or "micro-browsers" do not refresh or reload a network address (e.g., message retrieval address) that is already being displayed. As a consequence, it can be difficult for the replying messaging device to obtain or refresh the message retrieval address with the appended reply message, thereby making it difficult to provide conformed or matched messaging displays to both the replying and the destination messaging devices.

A commonly available network feature for implementing delivery of a message to a phone requesting that it load a URL into a cache is Wireless Access Protocol (WAP) Push, or a proprietary UP notification protocol, as is known in the art. The WAP Push implementation takes advantage of a little-known fact that if the requested URL matches the URL of the page the user is viewing, the page will refresh automatically with no intervention by the user. This requires that the application know the exact URL of the page within the application being viewed by the user. A reliable way to achieve this is for the page to always use the same URL for a given messaging session regardless of the content.

Figure 6:
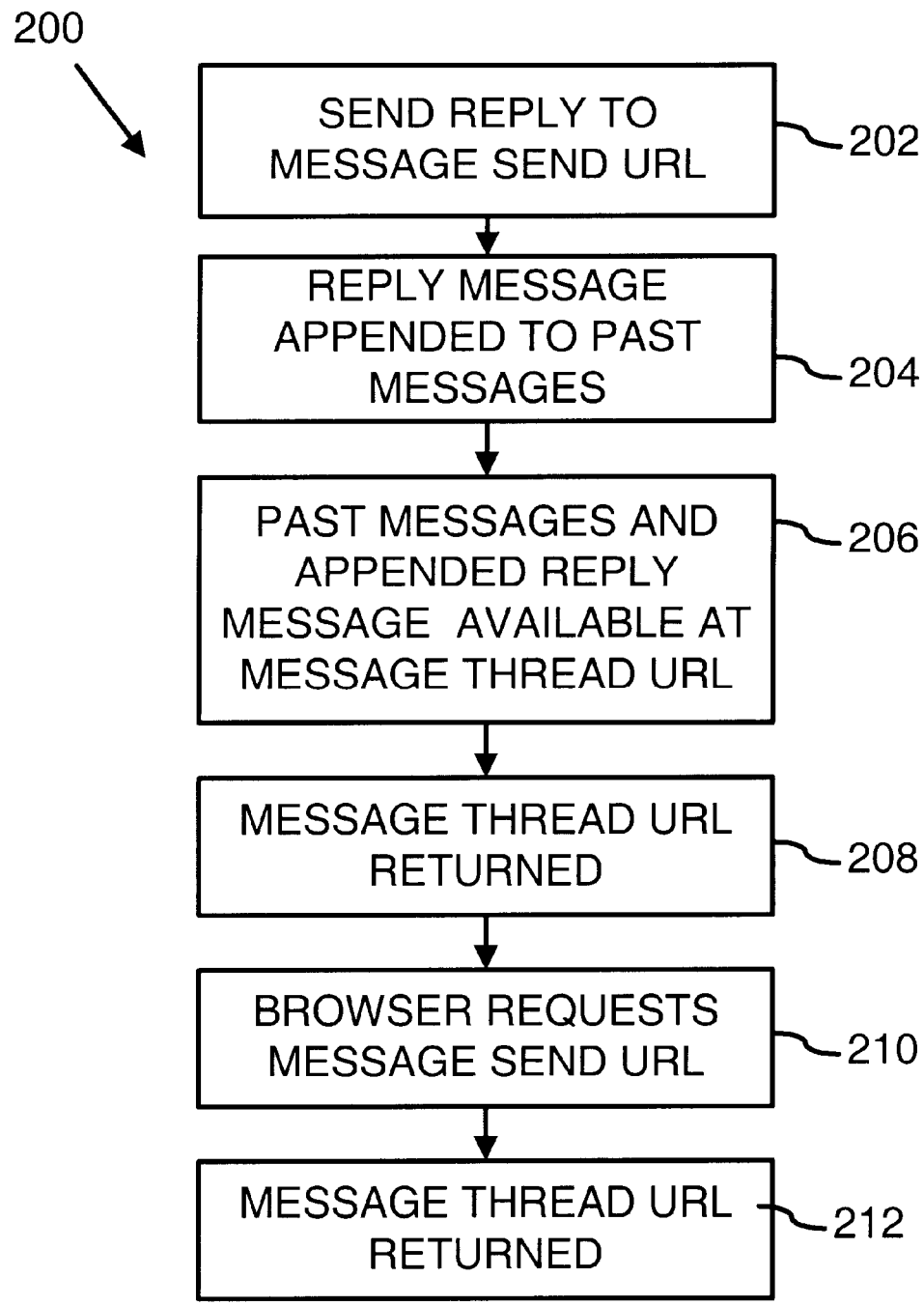
FIG. 6 is a flow diagram of a text message update process for updating an appended reply message.

FIG. 6 is a flow diagram of a text message update process 200 for updating an appended reply message.

Process block 202 indicates that a replying text messaging device sends a new replying text message to short text message display application 62 at a "message-send" network address or URL.

Process block 204 indicates that the new replying text message is appended to past text messages in the text message thread at the short text messaging application 62. The past text messages may have been stored or buffered at the short text message display application 62 or may have been sent there from the replying text messaging device.

Process block 206 indicates that short text message display application 62 makes the past text messages and the appended new replying text message available at a message thread network address or URL that differs from the message-send URL.

Process block 208 indicates that the message thread network address or URL differing from the message-send URL is returned to the text messaging device by the short text message display application 62.

Process block 210 indicates that a browser or microbrowser requests the message-send URL as an update or reload.

Process block 212 indicates that short text message display application 62 returns the message thread network URL in response to the update or reload request.

Reloading successive past messages from the same network address or URL creates a problem with the requirement to submit new messages to short text message display application 62 while returning to the same URL. The browser caches the URL and can refuse to reload it from short text message display application 62 when a page links back to itself. As described above, this can be overcome by requesting a different URL and using an HTTP redirect back to the original URL.

Figure 7:
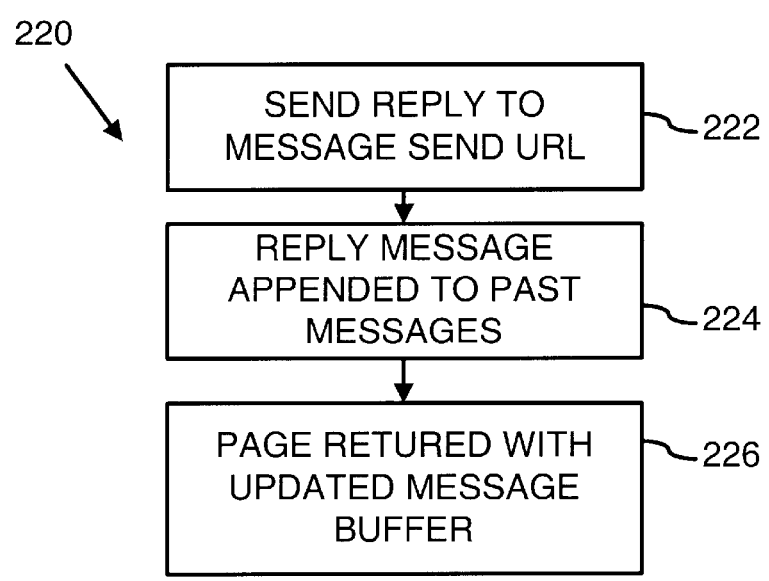
FIG. 7 is a flow diagram of another text message update process 220 for updating an appended reply message.

FIG. 7 is a flow diagram of another text message update process 220 for updating an appended reply message.

Process block 222 indicates that a replying text messaging device sends a new replying text message to short text message display application 62 at a "message-send" network address or URL.

Process block 224 indicates that the new replying text message is appended to past text messages in the text message thread at the short text messaging application 62. The past text messages may have been stored or buffered at the short text message display application 62 or may have been sent there from the replying text messaging device.

Process block 226 indicates that short text message display application 62 returns a page to the messaging device containing an updated message buffer. Accordingly, the content-location, as opposed to the content-type, specifies the URL of the page and is set to the message thread URL. This overcomes the problem of browser-cached URL by using the HTTP content-type header to specify a canonical URL for the page that is different from the URL that was used to request the page.

It will be appreciated that applications other than short text messaging could use the invention described above to push non-intrusive updates to a user. Stock quotes would be one example. The user could see stock prices change in near real-time on their screen, and on the same screen type in new stock symbols to monitor.

In accordance with the practices of persons skilled in the art of computer programming, the present invention is described below with reference to acts and symbolic representations of operations that are performed by such computer systems, unless indicated otherwise. Such acts and operations are sometimes referred to as being computer-executed and may be associated with the operating system or the application program as appropriate. It will be appreciated that the acts and symbolically represented operations include the manipulation by the CPU of electrical signals representing data bits which causes a resulting transformation or reduction of the electrical signal representation, and the maintenance of data bits at memory locations in the memory systems to thereby reconfigure or otherwise alter operation of the computer systems, as well as other processing of signals. The memory locations where data bits are maintained are physical locations that have particular electrical, magnetic, or optical properties corresponding to the data bits.

In view of the many possible embodiments to which the principles of this invention may be applied, it should be recognized that the detailed embodiments are illustrative only and should not be taken as limiting the scope of the invention. Rather, I claim as my invention all such embodiments as may come within the scope and spirit of the following claims and equivalents thereto.

What is claimed is:

1. A mobile telephone text messaging method that includes transmitting a text message between a first and second mobile telephone text messaging devices via a short text messaging application operating at a network portal that is separate from the first and second mobile telephone text messaging devices, comprising:

composing on the first mobile telephone text messaging device a new text message to be directed to the second mobile telephone text messaging device, the new text message being composed while a past text message is simultaneously displayed on the first mobile telephone text messaging device and not included in the new text message;

transmitting the new text message to the short text messaging application and appending the new message to the past text message at the network portal; and transmitting the new text message and the past text message from the short text messaging application to the second mobile telephone text messaging device.

2. The method of claim 1 further comprising appending the new text message to the past text message to form an appended message and transmitting the appended message to the second mobile telephone text messaging device.

3. The method of claim 1 further comprising transmitting the new text message and the past text message to the second mobile telephone text messaging device via a text message display application.

4. The method of claim 3 further comprising appending the new text message to the past text message to form an appended message and delivering the appended message to the second mobile telephone text messaging device.

5. The method of claim 4 in which the appended text message is formed by the text message display application.

6. The method of claim 3 further comprising transmitting the new text message and the past text message to the first mobile telephone text messaging device via a messaging service center.

7. The method of claim 1 in which transmitting the new text message and the past text message from the short text messaging application to the second mobile telephone text messaging device includes transmitting a network address for the new text message and the past text message to the second mobile telephone text messaging device.

8. The method of claim 7 in which the new text message and the past text message are part of a text message communication thread and in which transmitting a network address for the new text message and the past text message includes transmitting the same network address for each new text message and the past text message in the text message communication thread.

9. The method of claim 7 in which the new text message and the past text message are part of a text message communication thread and in which transmitting a network address for the new text message and the past text message includes transmitting the same network address as part of a HTTP redirect for each new text message and the past text message in the text message communication thread.

10. In computer readable media, mobile telephone text messaging software for a mobile telephone text messaging system that transmits a text message between a first and second mobile telephone text messaging devices via a short text messaging application operating at a network portal that is separate from the first and second mobile telephone text messaging devices, the software comprising:

software for composing on the first mobile telephone text messaging device a new text message to be directed to the second mobile telephone text messaging device, the new text message being composed while a past text message is simultaneously displayed on the first mobile telephone text messaging device and not included in the new text message;

software for transmitting the new text message to the short text messaging application and appending the new message to the past text message at the network portal; and software for transmitting the new text message and the past text message from the short text messaging application to the second mobile telephone text messaging device.

11. The media of claim 10, further comprising software for appending the new text message to the past text message to form an appended message and transmitting the appended message to the second mobile telephone text messaging device.

12. The media of claim 10 further comprising software for transmitting the new text message and the past text message to the second mobile telephone text messaging device via a text message display application.

13. The media of claim 12 further comprising software for appending the new text message to the past text message to form an appended message and software for delivering the appended message to the second mobile telephone text messaging device.

14. The method of claim 13 in which the appended text message is formed by the text message display application.

15. The media of claim 12 further comprising software for transmitting the new text message and the past text message to the first mobile telephone text messaging device via a messaging service center.

16. In a mobile telephone text messaging system that transmits a text message between a first and second mobile telephone text messaging devices via a short text messaging application operating at a network portal that is separate from the first and second mobile telephone text messaging devices, the system comprising:

means for composing on the first mobile telephone text messaging device a new text message to be directed to a second mobile telephone text messaging device, the new text message being composed while a past text message is available on the first mobile telephone text messaging device and not included in the new text message;

means for transmitting the new text message to the short text messaging application and appending the new message to the past text message at the network portal; and means for transmitting the new text message and the past text message from the short text messaging application for delivery to the second mobile telephone text messaging device.

17. The system of claim 16 further comprising means for appending the new text message to the past text message to form an appended message and transmitting the appended message to the second mobile telephone text messaging device.

18. The system of claim 16 further comprising means for transmitting the new text message and the past text message to the second mobile telephone text messaging device via a text message display application.

19. The system of claim 18 further comprising means for appending the new text message to the past text message to form an appended message and delivering the appended message to the second mobile telephone text messaging device.

20. The system of claim 18 further comprising means for transmitting the new text message and the past text message to the first mobile telephone text messaging device via a messaging service center.

21. The system of claim 16 in which the means for transmitting the new text message and the past text message from the short text messaging application to the second mobile telephone text messaging device transmits a network address for the new text message and the past text message to the second mobile telephone text messaging device.

22. The system of claim 21 in which the new text message and the past text message are part of a text message communication thread and in which transmitting a network address for the new text message and the past text message includes transmitting the same network address for each new text message and the past text message in the text message communication thread.

* * * * *